No. 757,761. PATENTED APR. 19, 1904.
E. F. MORAN.
DRAFT EQUALIZER.
APPLICATION FILED OCT. 27, 1903.
NO MODEL.

WITNESSES: INVENTOR
W. F. Doyle. Elijah F. Moran
N. Cleveland. BY
Alex. J. Wedderburn, Jr.
Attorney No. 757,761.

Patented April 19, 1904.

UNITED STATES PATENT OFFICE.

ELIJAH F. MORAN, OF CHOICE, MINNESOTA.

DRAFT-EQUALIZER.

SPECIFICATION forming part of Letters Patent No. 757,761, dated April 19, 1904.

Application filed October 27, 1903. Serial No. 178,739. (No model.)

*To all whom it may concern:*

Be it known that I, ELIJAH F. MORAN, a citizen of the United States, residing at Choice, in the county of Fillmore and State of Minnesota, have invented certain new and useful Improvements in Draft-Equalizers, of which the following is a specification.

This invention relates to certain new and useful improvements in draft-equalizers; and it has for its objects among others to provide an improved device of this character which shall be simple in its construction, efficient in operation, and not liable to injury.

It has for a further object to provide for the taking of the side draft off the binder. This I accomplish by bracing the center piece solid to the binder-pole, so it cannot move relatively thereto. I also make the portion to which the pair of horses are connected of less length than that to which the one horse is attached, whereby the whole evener will set straight on the pole. By my construction the evener will work equally as well under or on top of the pole or on a right-hand binder or a left-hand binder. I provide also for adjustment of the means for attachment of the one horse, whereby a four-horse evener may readily be provided instead of a three-horse evener. By making the center piece rigid with the pole the side draft is taken off, and the one horse does not have to push against the pole with his shoulder, but pulls out as straight as a two-horse wagon.

Other objects and advantages of the invention will hereinafter appear, and the novel features thereof will be specifically defined by the appended claim.

The invention is clearly illustrated in the accompanying drawings, which, with the numerals of reference marked thereon, form a part of this specification, and in which—

Figure 1:
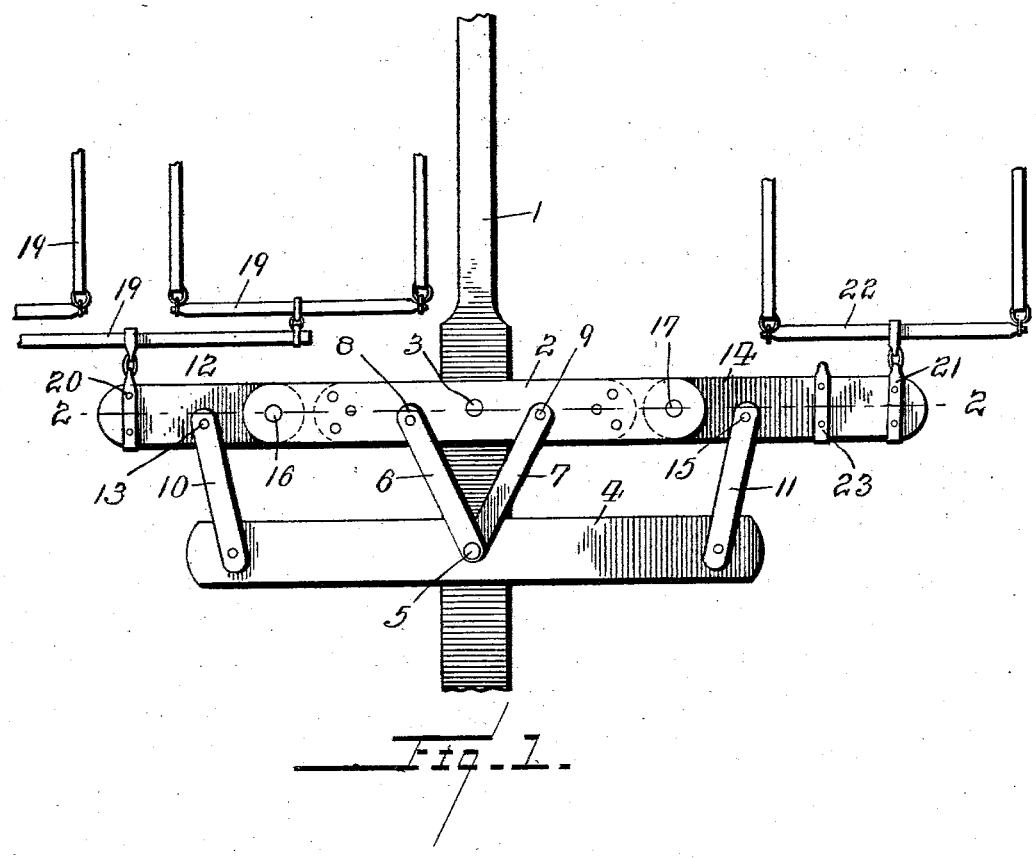
Figure 2:
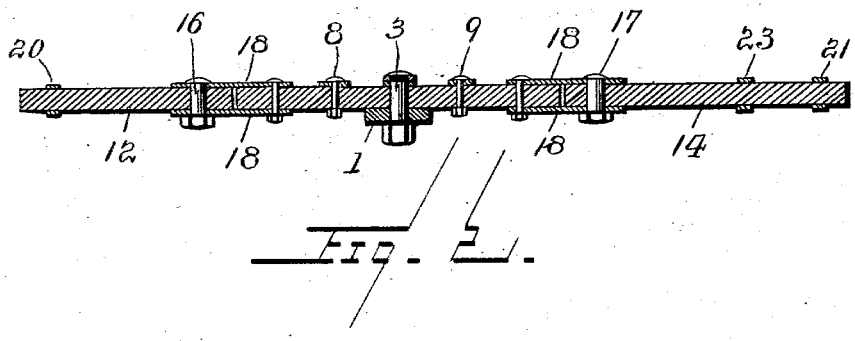

Figure 1 is a plan view of a draft-equalizer embodying my invention. Fig. 2 is a vertical cross-section through the same on the line 2 2 of Fig. 1.

Like numerals of reference indicate like parts throughout the different views.

Referring now to the drawings, 1 designates the pole, and 2 the center piece, which is connected to the pole at 3.

4 is a member parallel with the center piece 2. It is connected with the pole 1 at 5, while inclined or angularly-disposed braces 6 and 7, mounted at one end of the pin or bolt 5, have their other ends secured, as at 8 and 9, to the center piece 2 upon opposite sides of the pin or point of connection 3 of the center piece with the pole, all as shown clearly in Fig. 1.

10 and 11 are links disposed inclinedly, as seen in Fig. 1, one end of each being connected to the member 4, near its opposite ends, and the other ends connected with the long and short members of the evener.

12 is the shorter member, near the center of which, as at 13, the end of the link 10 is connected, while the longer member 14 has the end of the link 11 connected therewith, as at 15. The short member 12 is pivotally connected to the adjacent end of the member 2, as at 16, while the longer member 14 is pivotally connected, as at 17, with the adjacent end of the member 2, all as clearly seen in Fig. 1.

18 represents metal plates secured to the opposite ends of the member 2, as seen best in Fig. 2, and upon opposite sides thereof and between the ends of these plates, which project beyond the ends of the member 2, the adjacent ends of the long and short members are disposed and free to move.

19 is a two-horse evener connected with the short member 12 near its outer end, being connected with a clevis or the like 20, secured to said end and embracing the member, as seen in Fig. 2.

21 is a clevis or the like secured to the outer end of the longer member 14 for connection with the swingletree 22. 23 is another clevis or the like secured to the longer member 14, as seen in Figs. 1 and 2, and serving for the adjustment of the attachment of the swingletree when desired.

The advantages of the above construction will be apparent to any one skilled in this art and will be readily understood from the foregoing description, as will also the operation, and a further detailed description does not appear necessary.

Modifications in detail may be resorted to without departing from the spirit of the invention or sacrificing any of its advantages.

What is claimed as new is—

In a draft-equalizer, the combination with the pole and the center piece secured thereto, of the member parallel with the center piece and connected with the pole, the inclined braces, the long and short members in the same plane with the center piece and with each other and the plates upon opposite sides of said members and the center piece and forming the connections between the same and the said member, as and for the purpose specified.

In testimony whereof I affix my signature in presence of two witnesses.

ELIJAH F. MORAN.

Witnesses:
  F. A. OLSON,
  S. R. SEVERSON.